United States Patent Office 3,230,135
Patented Jan. 18, 1966

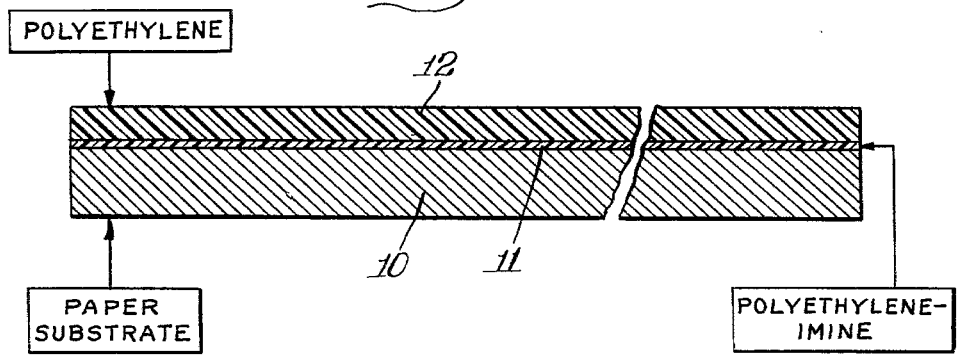
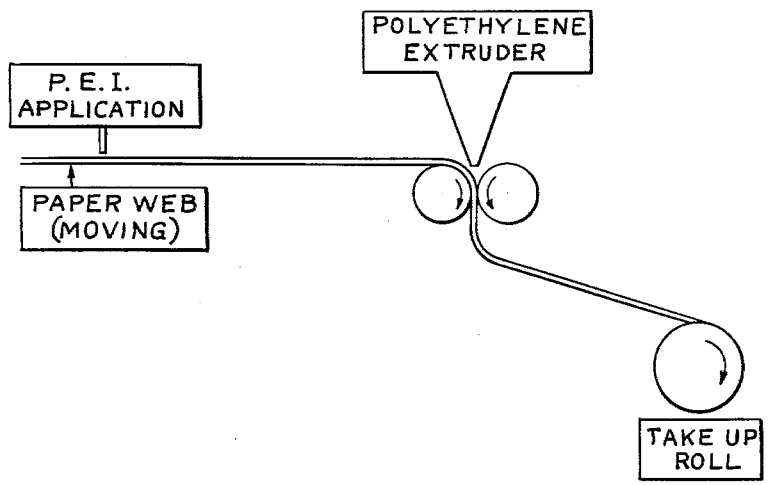

3,230,135
PROCESS FOR COATING PAPER USING A POLY-
IMINE PRECOAT AND PRODUCTS THEREOF
Alan R. Hurst, Hinsdale, Ill., assignor to Morton International, Inc., a corporation of Delaware
Filed July 9, 1965, Ser. No. 473,900
20 Claims. (Cl. 161—250)

This application is a continuation-in-part of my copending application Serial No. 303,986, filed August 23, 1963, which is a continuation-in-part of and was copending with my application Serial No. 241,571, filed December 3, 1962, now abandoned, which, in turn, is a continuation-in-part of and was copending with my application Serial No. 26,141, filed May 2, 1960, now abandoned.

This invention relates to a method of coating paper materials with a thin polymer film, and to the polymer-coated product. More particularly, it relates to a method of applying thin films of polyethylene to paper webs or sheets, and to improving the strength of the bond therebetween.

The problem of obtaining good adhesion and heat seal strength in extrusion-coated paper is difficult, in the case of polyolefin films in general and polyethylene films in particular, because these materials are highly inert and non-polar. The bond between the polyethylene film and paper is primarily a mechanical one related to the paper surface characteristics. In order to secure a good bond, it is necessary to apply the polyethylene to the paper at a sufficiently elevated temperature that the polyethylene film will soften and flow, to bond to the paper. It is generally necessary to heat the polyethylene substantially to the point where oxidation occurs. This point is often recognized by the unpleasant odor of the polyethylene. However, even with the use of temperatures as high as 625° F. at the extruder, it has been found difficult to satisfactorily bond thin films of polyethylene, such as, for example, films having a thickness in the neighbodhood of 1 mil, and it has been further found difficult to obtain satisfactory bonds when operating at coating speeds above about 500 feet per minute. Thus in applying a film of polyethylene to a substrate such as, for example, a sheet of paper, there are, in addition to the surface quality of the paper, five factors which materially influence the operating conditions and the results obtained. These factors which are critical are: the temperature of the polyethylene as it comes into contact with the paper; the rate of speed of the web as it and the polyethylene are brought together and subjected to pressure; the thickness of the film of polyethylene being applied; the temperature of the web surface; and the length of and conditions existing in the air gap between the lip of the extruder and the nip of the pressure rolls. Insofar as the air gap and its conditions are concerned, there is little other than the obvious which, from a practical viewpoint, can be done to improve adhesion. For instance, cold air blasts in the vicinity of the air gap should obviously be minimized. Also obviously, in many instances it would be desirable to minimize the distance from the die lips to the nip but adjustment of this is limited by the mechanical clearance of the die in the nip. Insofar as the temperature of the web surface is concerned, it has been found that heating the web improves adhesion and this is commonly done by a preheat roll just prior to the extrusion coating. Preheating is regarded as a standard operating practice and in this sense is not therefore a variable effecting adhesion. Therefore, from an operating or production viewpoint, there are three controllable factors that can effect the adhesion of the extruded polyethylene to the paper. The three controllable factors or conditions are interrelated, and while they may vary from machine to machine, there are recognized limits beyond which a given polyethylene cannot be satisfactorily bonded. Since these are critical, variances of one or more of these factors have caused failure to obtain satisfactory bond.

For instance, using a normal low density extrusion resin and extrusion coating a ½ mil film on a smooth paper stock such as milk carton moving at 350 feet per minute, the polyethylene melt temperature being about 600° F. at the extruder, a fair bond of the polyethylene to the paper might be obtained. However, dropping the melt temperature to 580–585° F. such as might be done to reduce the odor of oxidized polyethylene, would result in no or at best a marginal bond. In a similar manner, increasing the speed to 500 feet per minute would result in no or a marginal bond.

One object therefore of this invention is to provide a practical process for improving the adhesion and heat seal strength between a polyolefin coating and the surface of a paper web on which the coating is applied so that the factors mentioned above are no longer critical.

A related object of the invention is to provide a polyolefin coated article having improved adhesion and heat seal strength.

A more specific object of the invention is to provide a practical process for improving the adhesion and heat seal strength between an extrusion-coated polyolefin film, and particularly a polyethylene film, and the surface of a paper article, on which the coating is applied.

A related specific object of the invention is to provide a paper sheet that is extrusion-coated with a polyolefin film, particularly a polyethylene film, that is characterized by improved adhesion and heat seal strength.

Another object of the present invention is to provide a method whereby thinner films of polyethylene may be applied to sheets of paper with the same or better results as are now obtained with thicker films.

Another object of the invention is to provide a method whereby a polyethylene film may be applied at a lower melt temperature and higher speed to obtain as good if not better bond than heretofore obtainable.

Another object of the invention is to provide a method whereby a polyethylene film may be applied at a higher speed while maintaining good bond.

A further object is to provide a sheet of paper having a film of polyethylene bonded thereto, the bond between the polyethylene and paper being greater than heretofore obtainable.

Other objects of the invention will be apparent hereinafter from the specification and the drawings.

FIGURE 1 of the drawing is a fragmentary, cross-sectional view of a sheet of paper having a deposit of polyethyleneimine on one surface and having a film of polyethylene bonded thereto, over the deposit, in accordance with one embodiment of the present invention.

FIGURE 2 is a block flow diagram of the process of this invention.

I have found that a deposit of an organic polyimine which has the basic chain structure of a polyethyleneimine, i.e., having repeating units of —CCN—, either substituted or unsubstituted, connected end-to-end to form the chain, interposed between a substrate and a heat-sealed polymer coating thereon, particularly a polyethylene coating, improves adhesion and heat seal strength and has many process advantages. The organic polyimines useful are described herein as polyalkyleneimines in view of the repeating alkylene chain units interconnected by nitrogen. The polyalkyleneimines usable are of a character so that when applied in a proper amount they provide a bond substantially equivalent to the bond provided by polyethyleneimine or polypropyleneimine applied in an amount of from 0.001 to 1.0 pound, dry basis, per ream (3000 sq. ft.) of paper coated. The invention can be better understood from a consideration of the detailed description thereof in the specification which follows.

In its preferred embodiment, my invention comprises the method of applying, by roll coating, spraying and the like, a coating of polyethyleneimine to a web of paper prior to extruding a film of polyethylene on the paper. I have found that by this method, it is possible not only to obtain a better bond than is obtainable under present accepted operating conditions, but it is even possible to obtain a satisfactory bond under conditions which heretofore would not have produced a satisfactory bond. The polyethyleneimine is applied at a rate sufficient to deposit on the surface of the paper from 0.001 to 1.0 pound, dry basis, of polyethyleneimine per 3000 sq. ft. of paper coated.

Fiber tear or fiber pull from the paper substrate by the polyethylene coating is the test generally regarded in the packaging industry for demonstrating a satisfactory or good bond. If the bond of the polyethylene to the paper is such that the paper fails, i.e., fiber is pulled, then the bond is considered satisfactory. However, as is readily understood by those skilled in the art, for some papers, such as glassine, for example, which has an extremely smooth surface, fiber pull is encountered only under special conditions. Therefore, as hereinafter explained, actual bond strengths in terms of grams or pounds of pull per inch needed to separate the polyethylene from the paper may be determined to evaluate various polyimines as bonding agents in addition to the fiber tear test.

Polyethyleneimine is one of a family of polyalkyleneimines, including substituted polyalkyleneimines, which are usable in the practice of my invention. The formula for polyalkyleneimine is believed to be as follows:

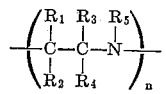

wherein $R_1$ through $R_4$ are each selected from the class consisting of hydrogen and lower alkyl groups, $R_5$ is selected from the class consisting of hydrogen, lower alkyl groups, hydroxy substituted lower alkyl groups, lower alkyl alkoxy groups, and fatty acid residue from the reaction of a fatty acid with the imine and $n$ is a whole number. The polyalkyleneimines include the quaternary ammonium compounds and salts of the above imine, e.g., quaternary chlorides, sulfates, nitrates, acetates, etc.

As mentioned above, with regard to the preferred embodiment of this invention, polyethyleneimine is useful and commercially available. A commercial polyethyleneimine known as Polymin P, made by Badische Anilin and Soda-Fabrik, A.G., has proved very satisfactory. This material has a molecular weight, according to the manufacturer, of about 30,000–40,000. Since this material is very viscous at room temperature, I prefer to dilute it to a solids content such as, for example, 1½% by weight, which is much easier to handle. Other polyethleneimines of varying molecular weights have also been used, and have been found satisfactory. However, the very low molecular weight polyethyleneimines, such as below about 2000, do not exhibit adhesive properties sufficient to provide the improvement of my invention, but compositions having molecular weights in excess of 2000 up to the point where they become so highly viscous as to become unmanageable, have been used with considerable success. Other polyimines have also been used successfully, even when such polyimines have lower molecular weights of about 800 or below. This wide range of compositions all seem to provide a commercially usable bond.

Where it is desirable to use a composition having a somewhat greater viscosity than the 1½% by weight solids content mentioned above with regard to a dilute polyethyleneimine solution it is advantageous to prepare an aqueous composition to contain a higher polymer content such as, for example, 9% polyethyleneimine by weight and to add a small amount, such as 1% to 5% by weight, of a suitable filler or thickener such as, for example, carboxymethyl cellulose, polyvinyl alcohol, methyl cellulose, starch, and the like. This composition is preferably then further diluted to a concentration of about 1½% by weight of the polyethyleneimine, dry basis, to provide a composition at a standardized concentration for convenience in application to the substrate.

I have found that when a paper web is coated with a thin deposit of a polyethyleneimine composition, as described above, prior to extrusion coating with polyethylene film, an excellent bond can be obtained at lower temperatures, with thinner film, with a higher rate of speed, and with a larger air gap, than heretofore has been possible. My invention can be better understood and appreciated by a comparison of extrusion coating conditions with and without the step of applying an imine coating to a paper web prior to lamination of the polyethylene thereto.

EXAMPLE 1

With conventional practices, only occasional or marginal adhesion was obtained when extrusion coating a paper web, such as milk carton stock, at 800 feet per minute, with a three inch air gap, with a film of about ½ mil in thickness of a branched-chain variety of polyethylene of a type commonly employed for extrusion coating applications, extruded from a melt at a temperature of about 625 F.

When the paper web was roll coated with an aqueous composition containing 1½% polyethyleneimine by weight, dry basis, prepared by dilution of Polymin P to deposit 0.01–0.025 lb. of polyethyleneimine, dry basis, per 3000 sq. ft. of paper, a satisfactory bond, which would pull fiber, was uniformly and consistently produced at 800 feet per minute between the polyethylene and the paper base under operating conditions that otherwise were those stated. In addition, when the speed was increased from 800 to 1500 feet per minute, a satisfactory bond was still produced.

Equally satisfactory results were obtained with deposits of polyethyleneimine ranging from 0.005 to 1.0 lb. per 3000 sq. ft. of paper. The effect is lost if excessive amounts of the polyethyleneimine are applied.

In FIGURE 1, I have shown a fragmentary cross-sectional view of a representative cellulose web having a coating of polyethyleneimine applied thereto and a thin film of polyethylene bonded to the coated surface of the paper. The paper or web of cellulose material is represented by the numeral 10 while the layers of polyethyleneimine and polyethylene are designated by 11 and 12, respectively. FIGURE 2 shows, in block form, a flow diagram of the method of application.

EXAMPLE 2

Under the extrusion coating conditions first set forth under Example 1, but at the lower extrusion melt temperature of 600° F., there was little or no adhesion between the polyethylene and the paper web; however, when the web was coated with polyethyleneimine, within the range specified above, good fiber tearing bonding was obtained at the 600° F. melt temperature and also at melt temperatures down to 580° F.

EXAMPLE 3

Since it was not possible to obtain satisfactory adhesion when operating at 800 feet per minute, with a 3 inch air gap, and a melt temperature of 600° F., with a 0.5 mil film of polyethylene on milk carton stock, it would not be expected that a satisfactory bond would be obtained if a 0.3 mil film were used, and such was found to be the case. However, when the paper web was coated with a layer of polyethyleneimine, in the range specified above, it was possible to obtain good adhesion of a 0.3 mil film under these extrusion conditions and a good bond was obtained with film thickness as low as 0.2 mil. The film thicknesses referred to herein are on the paper.

Additional examples have been made for the purpose of illustrating still other polyimines or polyalkyleneimines. In each of the following Examples 4–20, a coating solution was prepared by mixing the indicated polyalkyleneimine in 0.25 molar concentration as mols of the polyalkyleneimine monomer in a diluent and coating the solution onto paper to give the coat weight indicated. The diluent in each example was a 0.50% solution of sodium hexametaphosphate in water.

EXAMPLE 4

Poly 2,2-dimethylethyleneimine coated at 0.6 pound per ream.

EXAMPLE 5

Poly 2-ethylethyleneimine coated at 0.82 pound per ream.

EXAMPLE 6

Poly 2-methylethyleneimine coated at 0.77 pound per ream.

EXAMPLE 7

Poly N-methylethyleneimine coated at 0.53 pound per ream.

EXAMPLE 8

Poly N-(beta-hydroxyethyl) ethyleneimine, a product of Chemirad Corporation, coated at 0.62 pound per ream.

EXAMPLE 9

Poly N-(beta-hydroxyethyl) ethyleneimine, obtained from Dow Chemical Company and having a reported molecular weight of 800–1000 coated at 0.6 pound per ream.

EXAMPLE 10

Polyethyleneimine having 10% of the hydrogen on the nitrogen replaced with stearoyl and available under the trade name Chemicat S–10 from Chemirad Corporation coated at 0.69 pound per ream.

EXAMPLE 11

Polyethyleneimine having 10% of the hydrogen on the nitrogen replaced with lauroyl, available under the trade name Chemicat L–10 from Chemirad Corporation coated at 0.62 pound per ream.

EXAMPLE 12

Polyethyleneimine available from Chemirad Corporation and having a reported molecular weight of 30,000–40,000 coated at 0.48 pound per ream.

EXAMPLE 13

The polyethyleneimine of Example 12 partially neutralized with sulfuric acid to form the quaternary ammonium sulphate coated at 0.7 pound per ream.

EXAMPLE 14

The polyethyleneimine of Example 12 partially neutralized with acetic acid to form the quaternary ammonium acetate coated at 0.7 pound per ream.

EXAMPLE 15

The polyethyleneimine of Example 12 partially neutralized with hydrochloric acid to form the quaternary ammonium chloride coated at 0.6 pound per ream.

EXAMPLE 16

Polyethyleneimine having a reported molecular weight of 40,000–60,000 coated at 0.5 pound per ream.

EXAMPLE 17

Polyethyleneimine having a reported molecular weight in the range of 50,000–100,000 coated 0.7 pound per ream.

EXAMPLE 18

Polyethyleneimine reacted with an equivalent amount of ethylene oxide and having a molecular weight of 40,000–60,000 coated at 0.6 pound per ream.

EXAMPLE 19

Polyethyleneimine having 50% of the hydrogen on the nitrogen reacted with ethylene oxide and having a molecular weight of 40,000–60,000 coated at 0.6 pound per ream.

EXAMPLE 20

Polyethyleneimine having 30% of the hydrogen on the nitrogen reacted with ethylene oxide and having a molecular weight of 40,000–60,000 coated at 0.6 pound per ream.

Each solution was coated on the surface of a bleached glassine paper. Thereafter, under the extrusion coating conditions set forth under Example 2, at an extrusion melt temperature of 600° F., a polyethylene film was extruded over the surface of each sample at a thickness of 0.99 mil and at an extrusion web speed of 350 feet per minute. As a control, a bleached glassine paper was subjected to the same extrusion conditions except that no polyalkyleneimine coating was applied to the surface of the paper prior to extrusion. Each resulting laminate was then tested for bond strength on an Amthor tensile tester.

An Amthor tensile tester is a device used to determine bond strengths in the packaging industry. This apparatus is equipped with a pair of clamps or jaws one of which is designed to grip the paper portion of the laminate and the other the film portion of the laminate. A motor driven constant speed clamp separator is provided which drives the clamps or jaws apart at a set rate. The motor is connected to a calibrated indicator which records in units of weight the force required to force or break the bond on a sample.

The results of the above test for each of the samples of Examples 4–20 and the control are reported below as the force in grams per inch required to break the bond.

| Sample: | Force to break bond, g./in. |
|---|---|
| Control | 40 |
| Example 4 | 125 |
| Example 5 | 160 |
| Example 6 | * 385 |
| Example 7 | 110 |
| Example 8 | * 425 |
| Example 9 | 160 |
| Example 10 | 130 |
| Example 11 | 295 |
| Example 12 | * 440 |
| Example 13 | * 390 |
| Example 14 | * 440 |
| Example 15 | * 340 |
| Example 16 | * 300 |
| Example 17 | * 470 |
| Example 18 | 170 |
| Example 19 | * 370 |
| Example 20 | * 360 |

*Polyethylene film snapped during bond determination.

In each instance, the coated samples outperformed the control. The polyimines tested can be classified as being members of the class consisting of polyethyleneimine, polypropyleneimine, polybuteneimine, polyisobuteneimine, poly N-methylethyleneimine, poly N-(beta-hydroxyethyl)ethyleneimine, poly N-(fatty acid) ethyleneimine, poly N-(ethylene oxide) ethyleneimine, and copolymers and quaternary ammonium salts thereof. In such terminology, the term "fatty acid" denotes a group derived from a fatty acid, e.g., a $C_8$ to $C_{22}$ open chain carboxylic acid, which is reacted with the nitrogen of the polyimine to replace the free hydrogen. Other terms are self-explanatory. Still other polyimines can be used and may be evident to those skilled in the art.

Although the above examples used milk carton stock and glassine paper as packaging weight papers, other packaging weight papers, of course, can also be used. Such other packaging weight papers include kraft paper, sulfite paper, greaseproof paper, parchment, and the like.

As has been indicated, the operable limits of polyethyleneimine as a surface coating on paper is an amount of from about 0.001 to 1 lb. per ream dry basis. These coat weights appear to work well with other polyimines tested. However, it may be that due to molecular size or other considerations, higher coat weights can be used. In the event bond strength decreases with high coat weights, a decrease in coat weight rather than an increase would be indicated to improve the bond strength.

Numerous other examples could be given showing the results obtained by my method, but it is believed that the present invention may be readily understood without setting forth further examples.

Since oxidation of polyolefin introduces objectionable odors and impairs heat sealing properties, it can be readily appreciated that as my invention allows lamination to be carried out at a lower melt temperature than heretofore possible, there is less risk of damage to the polyolefin film. In addition, a lower operating temperature will allow the use of additional resins which heretofore could not have been used because of the excessive temperatures needed to secure adhesion between the resin and the paper. Moreover, my improved method allows the paper to be operated at a higher speed than heretofore possible, and/or makes it possible to use thinner films of polyolefin.

I have further found that the bond between the web of paper having a coating of polyalkyleneimine thereon and the polyolefin film may also be improved if the paper is heated prior to being brought into engagement with the polyolefin. The coated paper may be heated from room temperature to a point slightly below its charring temperature, and I have found that if the paper is heated to approximately 200° F. when the other factors such as film thickness, melt temperature, length of air gap, and speed of movement of the paper web remain constant, the preheating of the paper improves the bond obtained.

I have also found it advantageous to dry the paper web after applying the polyalkyleneimine and before laminating the polyolefin thereto. In practice this is readily accomplished by applying the polyalkyleneimine to the paper web at the time of manufacture of the web, as at a point adjacent the calender rolls, size press or any other suitable point in the dry end of the paper making process. Since there may be a lapse of several days or even several weeks, between the time of the manufacture of the paper and the coating thereof with the polyolefin, this method automatically provides a period of drying for the polyalkyleneimine. If it is not feasible to apply the polyalkyleneimine at the time the paper web is made, it may be applied at any time prior to lamination. In actual practice it may often prove convenient to combine the application of the polyalkyleneimine and the lamination of the polyolefin in a single handling of the paper web. This may be done by applying the polyalkyleneimine by any of the means described earlier, drying the web, and then bringing the coated web into contact with the extruded film of polyolefin. It will be readily understood that this arrangement may be easily set up for continuous operation.

The foregoing examples and discussion have related to preferred embodiments of the invention. In its broad aspects, the invention is of general applicability to heat-sealed polymer coatings of many types.

As to the substrate, while the invention is primarily concerned with the improvement of the extrusion coating process for laminating polyethylene film to paper, it is applicable to the coating of other paper articles with heat-sealed polymer films, including heavy paper fiber boards, and paper webs of all types.

As to the polymer film, the invention is applicable to polyolefins and particularly polyethylenes substituted or unsubstituted of all types commonly used for coating applications. For example, the invention can be successfully practiced with films made of the polyethylenes of the conventional branched type having such different properties as are tabulated below in Table 1.

Table 1.—Representative suitable polyethylene films

| Resin No. | Density | Melt Index* |
|---|---|---|
| 1 | 0.917 | 3.4 |
| 2 | 0.923 | 3.1 |
| 3 | 0.915 | 23.0 |
| 4 | 0.930 | 3.0 |
| 5 | 0.923 | 8.0 |
| 6 | 0.918 | 10.0 |

*The term "melt index" is a standard measure of the melt viscosity of polyethylenes and is expressed as the number of grams flowing through a standard orifice in a unit of time at a standard temperature and pressure.

Resins 1, 3, and 6 are in the low density range but vary in melt index from very low to very high. Resin 4 is an intermediate density branched resin, near the upper end of the density range for commercial branched polyethylenes. The other resins are intermediate these in density. These resins can be extruded at melt temperatures in the range of 550° F. to 625° F., depending on gauge, and use of the present invention generally permits the use of lower temperatures, with good results, than would be possible otherwise.

The invention is equally applicable to polypropylene films, and to films made of copolymers of either ethylene or propylene with each other or with vinyl acetate, vinyl chloride, methylmethacrylate, tetrafluorethylene, butene-1, and other olefinically unsaturated monomers. The expression "polyolefin" is used herein to refer to such polymers. The advantages of the invention are best realized when the film is a heat-sealable polymer film formed from a monomer consisting predominantly of a lower olefin, that is, an olefin having 2, 3, or 4 carbon atoms. While ordinarily branched chain, low density resins would be used, important advantages are realized with films of high density resins, linear resins, and stereospecific resins.

It will thus be seen that the invention accomplishes its objects and while it has been herein disclosed by reference to the details of preferred embodiments, it is to be understood that such disclosure is intended in an illustrative, rather than a limiting sense, as it is contemplated that various modifications in the materials and method steps will readily occur to those skilled in the art, within the spirit of the invention and the scope of the appended claims.

I claim:
1. The method of adhering a polyolefin film to a paper and the like web to provide an improved polymer coated product, comprising the steps of: coating a web of packaging weight paper with an amount of polyimine having a monomeric unit structural formula of

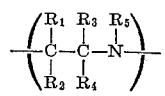

wherein $R_1$ through $R_4$ are each selected from the class consisting of hydrogen and lower alkyl groups, $R_5$ is selected from the class consisting of hydrogen, lower alkyl groups, hydroxy substituted lower alkyl group, lower alkyl alkoxy groups and fatty acid residue from the reaction of a fatty acid with the imine, said polyimine having a molecular weight in excess of about 800 and being applied so as to provide from about 0.001–1.0 lb. dry basis per 3000 sq. ft. of said web and extruding onto said web while it is moving at a rate of from about 350 to 1500 ft./min. a film which is a member of the class consisting of polyethylene, polypropylene, copolymers of ethylene and propylene, ethylene and vinyl acetate, ethylene and vinyl chloride, ethylene and methylmethacrylate, ethylene and tetrafluorethylene, ethylene and butene-1, propylene and vinyl acetate, propylene and vinyl chloride, propylene and methylmethacrylate, propylene and tetrafluorethylene and propylene and butene-1, wherein all of said copolymers have a predominant quantity of olefinic monomer, said film having a thickness of from about 0.2 to 1 mil and said film being extruded at a temperature taken at the adapter or die lands of the extruder of from about 555 to 625° F.

2. The method of adhering a polyolefin film to a paper and the like web to provide an improved polymer coated product, comprising the steps of: coating a web of packaging weight paper with an amount of polyalkyleneimine having a molecular weight in excess of about 800 so as to provide from about 0.001–1.0 lb. dry basis of a member of the class consisting of polyethyleneimine, polypropyleneimine, polybuteneimine, polyisobuteneimine, poly N-methyl ethyleneimine, poly N-(β-hydroxyethyl) ethyleneimine, poly N-(fatty acid) ethyleneimine, poly N-(ethylene oxide) ethyleneimine, and copolymers and quaternary ammonium salts thereof, per 3000 sq. ft. of said web and extruding onto said web while it is moving at a rate of from about 350 to 1500 ft./min. a film which is a member of the class consisting of polyethylene, polypropylene, copolymers of ethylene and propylene, ethylene and vinyl acetate, ethylene and vinyl chloride, ethylene and methylmethacrylate, ethylene and tetrafluorethylene, ethylene and butene-1, propylene and vinyl acetate, propylene and vinyl chloride, propylene and methylmethacrylate, propylene and tetrafluorethylene, and propylene and butene-1, wherein all of said copolymers in said second class have a predominant quantity of olefinic monomer, said film having a thickness from about 0.2 to 1 mil and said film being extruded at a temperature taken at the adapter or die lands of the extruder of from about 555 to 625° F.

3. The method of adhering a polyolefin film to a paper and the like web to provide an improved polymer coated product, comprising the steps of: coating a web of packaging weight paper with an amount of polyalkyleneimine having a molecular weight in excess of about 2000 so as to provide from about 0.001–1.0 lb. dry basis of a member of the class consisting of polyethyleneimine and polypropyleneimine per 3000 sq. ft. of said web and extruding onto said web while it is moving at a rate of from about 350 to 1500 ft./min. a film which is a member of the class consisting of polyethylene, polypropylene, copolymers of ethylene and propylene, ethylene and vinyl acetate, ethylene and vinyl chloride, ethylene and methylmethacrylate, ethylene and tetrafluorethylene, ethylene and butene-1, propylene and vinyl acetate, ethylene and vinyl chloride, propylene and methylmethacrylate, propylene and tetrafluorethylene, and propylene and butene-1, wherein all of said copolymers have a predominant quantity of olefinic monomer, said film having a thickness from about 0.2 to 1 mil and said film being extruded at a temperature taken at the adapter or die lands of the extruder of from about 555 to 625° F.

4. The method of claim 3 wherein said web is heated from about room temperature up to a point just below its charring temperature.

5. The method of claim 3 wherein said member of said first class is polyethyleneimine and said member of said second class is polypropylene.

6. The method of claim 3 wherein said member of said first class is polyethyleneimine and said member of said second class is a copolymer of ethylene and butene-1.

7. The method of claim 3 wherein said member of said first class is polyethyleneimine and said member of said second class is a copolymer of propylene and butene-1.

8. The method of claim 3 wherein said member of said first class is polyethyleneimine and said member of said second class is a copolymer of ethylene and vinyl acetate.

9. The method of adhering a polyethylene film to a paper and the like web to provide an improved polymer coated product, comprising the steps of: coating a web of packaging weight paper with an amount of polyethyleneimine having a molecular weight in excess of about 2000 so as to provide from about 0.001–1.0 lb. dry basis of said polyethyleneimine per 3000 sq. ft. of said web, and extruding onto said web while it is moving at a rate of from about 350 to 1500 ft./min. a polyethylene film having a thickness of from about 0.2 to 1 mil, said film being extruded at a temperature taken at the adapter or die lands of the extruder of from about 555 to 625° F.

10. The method of claim 9 wherein said web is heated from about room temperature up to a point just below its charring temperature.

11. A composite structure which comprises, in intimate joined lamination, a substrate layer of packaging weight paper, an intermediate adhesion promoting layer of between about 0.001–1.0 lb. per 3000 sq. ft. of said substrate surface of a polyimine having a monomeric unit structural formula of

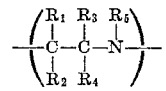

wherein $R_1$ through $R_4$ are each selected from the class consisting of hydrogen and lower alkyl groups, $R_5$ is selected from the class consisting of hydrogen, lower alkyl group, hydroxy substituted lower alkyl groups, lower alkyl alkoxy groups and fatty acid residue from the reaction of a fatty acid with the imine, said polyimine having a molecular weight in excess of about 800, and a tightly adhered layer over said applied coating of polyimine of an extruded film having a thickness from about 0.2–1 mil, said film being a member of the class consisting of polyethylene, polypropylene, copolymers of ethylene and propylene, ethylene and vinyl acetate, ethylene and vinyl chloride, ethylene and methylmethacrylate, ethylene and tetrafluorethylene, ethylene and butene-1, propylene and vinyl acetate, propylene and vinyl chloride, propylene and methylmethacrylate, propylene and tetrafluoroethylene and propylene and butene-1, wherein all of said copolymers have a predominant quantity of olefinic monomer, said film having been extruded onto said substrate at a temperature taken at the adapter or die lands of the extruder of from about 555 to 625° F. while said substrate is moving at a rate of from about 350 to 1500 ft./min.

12. A composite structure which comprises, in intimate joined lamination, a substrate layer of packaging weight paper, an intermediate adhesion promoting layer of between about 0.001–1.0 lb. per 3000 sq. ft. of said substrate surface of a member of the class consisting of polyethyleneimine, polypropyleneimine, polybuteneimine, polyisobuteneimine, poly N-methyl ethyleneimine, poly N-(β-hydroxyethyl) ethyleneimine, poly N-(fatty acid) ethyleneimine, poly N-(ethylene oxide) ethyleneimine, and copolymers and quaternary ammonium salts thereof, all having a molecular weight in excess of about 800, and a tightly adhered layer over said applied coating of said member of said first class of an extruded film having a thickness from about 0.2 to 1 mil, said film being a member of the class consisting of polyethylene, polypropylene, copolymers of ethylene and propylene, ethylene and vinyl acetate, ethylene and vinyl chloride, ethylene and methylmethacrylate, ethylene and tetrafluorethylene, ethylene and butene-1, propylene and vinyl acetate, propylene and vinyl chloride, propylene and methylmethacrylate, propylene and tetrafluorethylene, and propylene and butene-1, wherein all of said copolymers of said second class have a predominant quantity of olefinic monomer, said film having been extruded onto said substrate at a temperature taken at the adapter or die lands of the extruder of from about 555 to 625° F. while said substrate is moving at a rate of from about 350 to 1500 ft./min.

13. A composite structure which comprises, in intimate joined lamination, a substrate layer of packaging weight paper, an intermediate adhesion promoting layer of between about 0.001–1.0 lb. per 3000 sq. ft. of said substrate surface of a member of the class consisting of polyethyleneimine and polypropyleneimine having a molecular weight in excess of about 2000, and a tightly adhered layer over said applied coating of said member of said first class of an extruded film having a thickness from about 0.2 to 1 mil, said film being a member of the class consisting of polyethylene, polypropylene, copolymers of an ethylene and propylene, ethylene and vinyl acetate, ethylene and vinyl chloride, ethylene and methylmethacrylate, ethylene and tetrafluorethylene, ethylene and butene-1, propylene and vinyl acetate, propylene and vinyl chloride, propylene and methylmethacrylate, propylene and tetrafluorethylene, and propylene and butene-1, wherein all of said copolymers have a predominant quantity of olefinic monomer, said film having been extruded onto said substrate at a temperature taken at the adapter or die lands of the extruder of from about 555 to 625° F. while said substrate is moving at a rate of from about 350 to 1500 ft./min.

14. The structure of claim 13 wherein said substrate at extrusion is at a temperature just below its charring temperature.

15. The structure of claim 13 wherein said member of said first class is polyethyleneimine and said member of said second class is polypropylene.

16. The structure of claim 13 wherein said member of said first class is polyethyleneimine and said member of said second class is a copolymer of ethylene and butene-1.

17. The structure of claim 13 wherein said member of said first class is polyethyleneimine and said member of said second class is a copolymer of propylene and butene-1.

18. The structure of claim 13 wherein said member of said first class is polyethyleneimine and said member of said second class is a copolymer of ethylene and vinyl acetate.

19. A composite structure which comprises, in intimate joined lamination, a substrate layer of packaging weight paper, an intermediate adhesion promoting layer of between about 0.001–1.0 lb. per 3000 sq. ft. of said substrate surface of polyethyleneimine having a molecular weight in excess of about 2000, and a tightly adhered layer over said applied coating of polyethyleneimine of an extruded polyethylene film having a thickness of from about 0.2 to 1 mil, said film having been extruded onto said substrate at a temperature taken at the adapter or die lands of the extruder of from about 555 to 625° F. while said substrate is moving at a rate of from about 350 to 1500 ft./min.

20. The structure of claim 19 wherein said substrate is heated from about room temperature up to a point just below its charring temperature.

References Cited by the Examiner

UNITED STATES PATENTS

| | | | |
|---|---|---|---|
| 2,828,237 | 3/1958 | Rosser | 156—331 |
| 2,940,889 | 6/1960 | Justice | 117—145 |
| 2,957,796 | 10/1960 | Pattilock et al. | 162—169 |
| 2,961,367 | 11/1960 | Weisgerber | 162—158 |
| 3,033,707 | 5/1962 | Lacy et al. | 156—158 |
| 3,140,196 | 7/1964 | Lacy et al. | 156—244 |

FOREIGN PATENTS 467,655   12/1951   Italy.

ALEXANDER WYMAN, *Primary Examiner.*

R. J. ROCHE, *Assistant Examiner.*